(12) United States Patent
Ali

(10) Patent No.: US 8,832,918 B2
(45) Date of Patent: Sep. 16, 2014

(54) FRAME DEVICE WITH SHIMMING ELEMENTS FOR INSTALLING A GLASS PLANE

(75) Inventor: Raza Ali, Cambridge (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 769 days.

(21) Appl. No.: 12/916,162

(22) Filed: Oct. 29, 2010

(65) Prior Publication Data

US 2012/0102711 A1    May 3, 2012

(51) Int. Cl.
| | |
|---|---|
| B23P 11/00 | (2006.01) |
| B23P 19/00 | (2006.01) |
| B23P 19/10 | (2006.01) |
| B62D 65/06 | (2006.01) |

(52) U.S. Cl.
CPC ............ B23P 19/10 (2013.01); *B23P 2700/50* (2013.01); *B62D 65/06* (2013.01)
USPC ................... 29/429; 29/464; 29/434; 29/423; 29/709; 294/65

(58) Field of Classification Search
CPC ...... B23P 19/10; B23P 2700/50; B62D 65/06
USPC ............................ 29/423–429, 729, 739, 789; 414/735–737; 294/65.1
See application file for complete search history.

(56) References Cited

U.S. PATENT DOCUMENTS

| | | | |
|---|---|---|---|
| 4,466,657 A | 8/1984 | Kaltz et al. | |
| 4,503,638 A | 3/1985 | Schindehutte | |
| 4,601,091 A * | 7/1986 | Grimm et al. | 29/423 |
| 4,716,641 A | 1/1988 | Shrimpton | |
| 4,850,639 A | 7/1989 | Gorski | |
| 4,941,707 A | 7/1990 | Ohrle et al. | |
| 5,085,622 A | 2/1992 | Kohlpaintner et al. | |
| 5,165,164 A * | 11/1992 | Kubo et al. | 29/784 |
| 5,203,814 A | 4/1993 | Kushizaki et al. | |
| 5,778,517 A * | 7/1998 | Amesbichler et al. | 29/709 |
| 6,035,510 A | 3/2000 | Amesbichler et al. | |
| 6,493,919 B2 | 12/2002 | Morrison et al. | |
| 6,580,956 B1 | 6/2003 | Sargent et al. | |
| 6,785,948 B2 | 9/2004 | Cittadini et al. | |
| 6,874,218 B2 | 4/2005 | Hicks et al. | |

(Continued)

FOREIGN PATENT DOCUMENTS

GB    1 447 491    10/1972

*Primary Examiner* — Minh Trinh
(74) *Attorney, Agent, or Firm* — Oblon, Spivak, McClelland, Maier & Neustadt, L.L.P.

(57) ABSTRACT

A device that includes a frame having a first part and a second part and a plurality of first suction devices connected to the first part of the frame, the first suction devices positioned so as to contact a glass plane. Also included in the device is a plurality of second suction devices connected to the second part of the frame, the second suction devices positioned so as to contact a body having an opening to receive the glass plane. A plurality of positioning components that position the frame with respect to the opening in the body, the positioning components connected to the first part of the frame and a plurality of shimming elements that move down between the glass plane and the opening and shift the glass plane forward, the shimming elements connected to the first part of the frame are as included in the device.

17 Claims, 13 Drawing Sheets

(56) References Cited

U.S. PATENT DOCUMENTS

| | | | |
|---|---|---|---|
| 7,677,622 B2 * | 3/2010 | Dunkmann et al. | 294/65 |
| 8,290,624 B2 * | 10/2012 | Hjornet | 700/259 |
| 2006/0225847 A1 | 10/2006 | Davies et al. | |
| 2012/0102711 A1 * | 5/2012 | Ali | 29/429 |

* cited by examiner

FRAME DEVICE WITH SHIMMING ELEMENTS FOR INSTALLING A GLASS PLANE

BACKGROUND

1. Field of the Disclosure

The present disclosure relates to a system and method for automated shimming of glass.

2. Description of the Related Art

In the past, when glass has been installed into a void in a wall or in a car, it has been necessary to center the glass in the void. Typically this centering process has been performed manually by an installer. This manual process is time consuming and often results in inaccurate installation.

SUMMARY

Accordingly, the present disclosure describes, inter alia, a device that includes a frame having a first part and a second part and a plurality of first suction devices connected to the first part of the frame, the first suction devices positioned so as to contact a glass plane. Also included in the device is a plurality of second suction devices connected to the second part of the frame, the second suction devices positioned so as to contact a body having an opening to receive the glass plane. A plurality of positioning components that position the frame with respect to the opening in the body, the positioning components connected to the first part of the frame and a plurality of shimming elements that move down between the glass plate and the opening and shift the glass plate forward, the shimming elements connected to the first part of the frame are as included in the device.

The present disclosure also describes a method implemented using an installing device, the installing device having a frame including a first part and a second part, a plurality of first suction devices connected to the first part of the frame, a plurality of second suction devices connected to the second part of the frame, a plurality of positing components connected to the first part of the frame, and a plurality of shimming elements connected to the first part of the frame. The method includes the steps of positioning the first suction devices so as to contact a glass plane, positioning the second suction devices so as to contact a body having an opening to receive the glass plane, positioning the frame with respect to the opening in the body using the positioning components, and directing the shimming elements to move down between the glass plate and the opening to shift the glass plate forward.

The present disclosure also describes a device that includes supporting means including a first part and a second part. Also included in the device are first suction means, connected to the first part of the supporting means, for contacting a glass plane, second suction means, connected to the second part of the supporting means, for contacting a body having an opening to receive the glass plane and positioning means for positioning the supporting means with respect to the opening in the body, the positioning means connected to the first part of the supporting means. Also there is included in the device shimming means for moving down between the glass plane and the opening and for shifting the glass plane forward, the shimming means connected to the first part of the supporting means.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
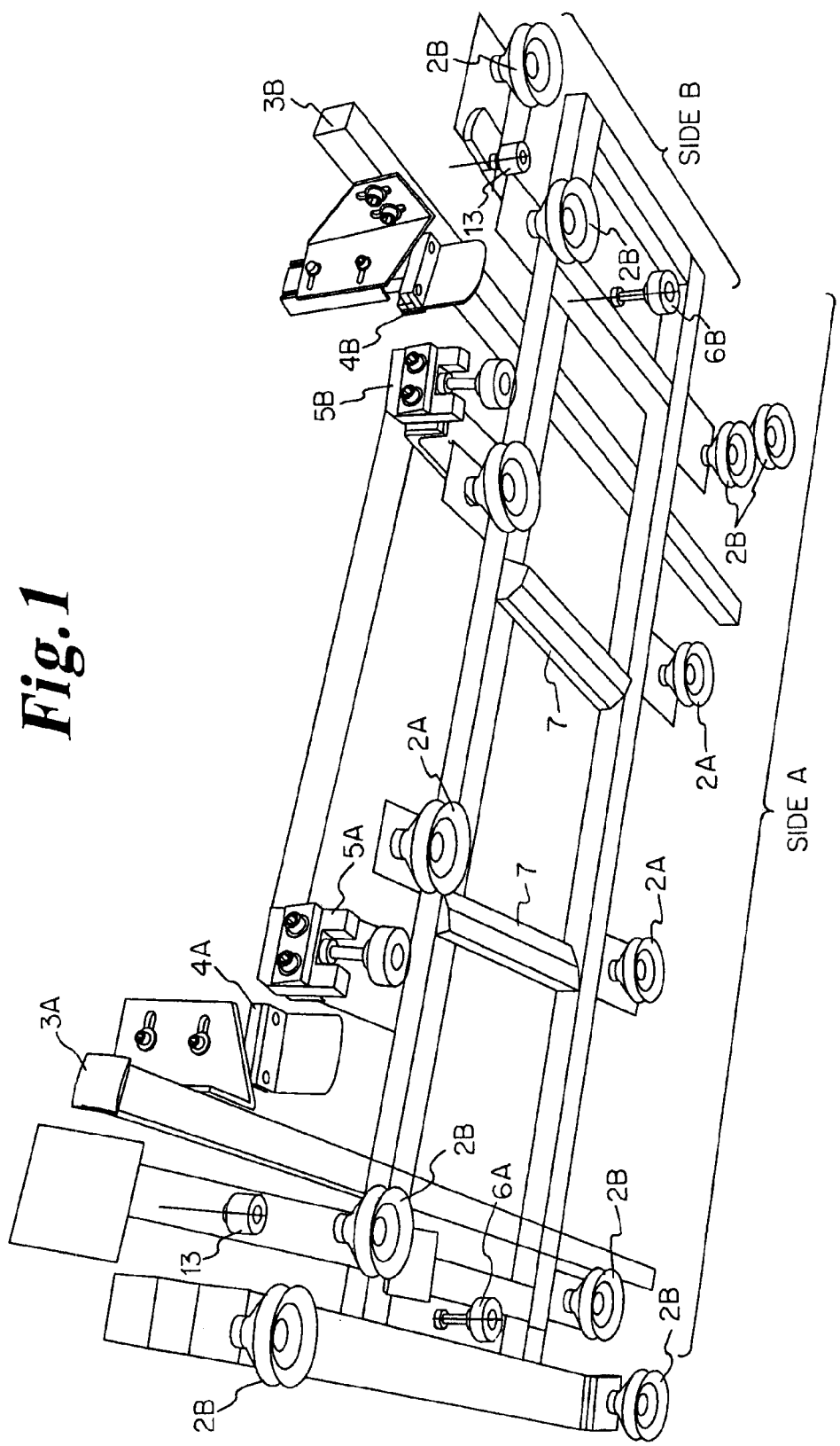
FIG. 1 illustrates a frame for leveling and shifting forward sunroof glass.

Referring now to the drawings wherein like reference numbers designate identical or corresponding parts throughout the several views and more particularly to FIG. 1 thereof, there is illustrated a frame for leveling and shifting forward sunroof glass.

FIG. 1 illustrates a frame 1 having a first part and a second part. The first part having a plurality of suction cups 2A attached thereto which are designed to attach to a sunroof 18 illustrated in FIG. 2, and the second part having a plurality of suction cups 2B attached thereto which are designed to attach to the a body. of a vehicle 17 illustrated in FIG. 2, 3, and 4B. Also attached to the first part of the frame 1 are guide bars 3A and 3B. Attached to guide bars 3A and 3B are shims 4A and 4B. The shims 4A and 4B may be made of Plastic (UHMW) material or some other suitable material which prevents damage to a part of the vehicle 17 including the sunroof 18 when implemented. The shims 4A and 4B may be of varying lengths, or of the same length. In addition, the thicknesses of the shims 4A and 4B are the same value, such as 3.2 mm. Also attached to the first part of the frame 1 are datuming blocks 5A and 5B which locate the frame 1 correctly on a vehicle roof panel by lining up longer sides of the frame 1 (side A) with a sunroof opening 10 illustrated in FIG. 2 and 3 Also attached to the frame 1 are side datuming blocks 6A and 6B which line up the shorter sides of the frame 1 (side B) with the corresponding side of the sunroof opening 10. The datuming blocks 5A-6B are precise components which may be made of a hard plastic or some other material which is suitable to support the function of the blocks (e.g. lining up the frame 1 with the opening). Although the datuming blocks 5A-6B are shown in the drawings as being disk shaped, the datuming blocks 5A-6B can also be square or partially spherical or any other suitable shape. In addition, attached to the frame 1 are lighting elements 7 and positioning blocks 13. The lighting element 7 emit light.

In addition, attached to the frame are lighting elements 7 and positioning blocks 13.

Figure 2:
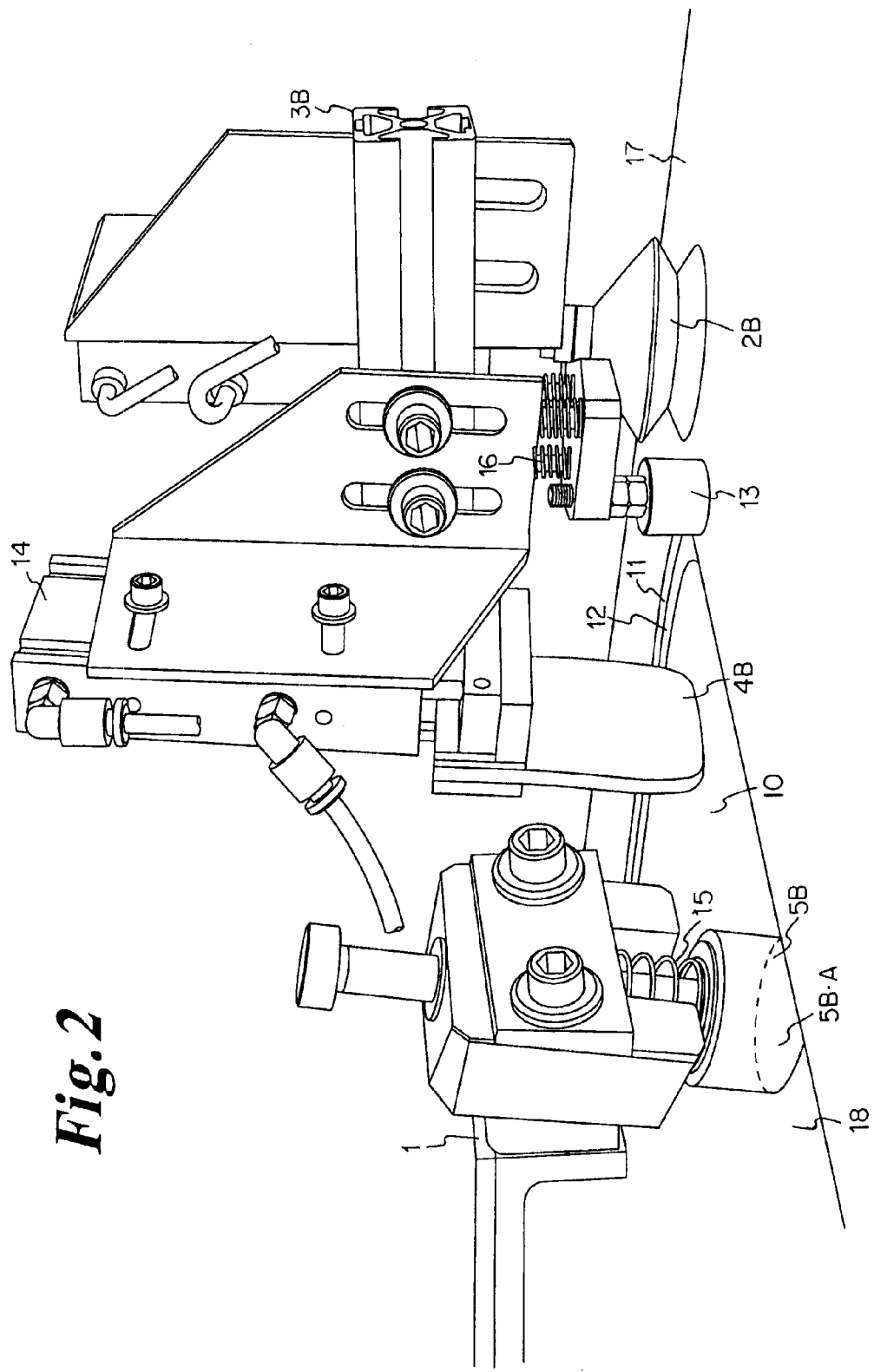
FIG. 2 illustrates a closer view of certain elements attached to the frame such as a shim.

FIG. 2 illustrates a closer view of guide bar 3B, shim 4B and datuming block 5B. As is shown in FIG. 2, the frame 1 is positioned with the sunroof opening 10 of the vehicle roof 17 in which the sunroof 18 is disposed using the datuming blocks 5A and 5B. The datuming block 5B has an outside surface 5B-A which is in contact with an edge of the of the vehicle 17 surrounding the sunroof opening 10. In addition, spring 15 allows the datuming block 5B to move down such that a bottom surface contacts the sunroof 18, or a gasket 12 or both. Positioning block 13 contacts the roof the vehicle 17 and also includes spring 16 which allows the block 13 to have a bottom surface which contacts the roof 17. Block 13 allows the frame 1 (end effector) to rest on the roof of the vehicle 17 without causing any scratch marks. Springs 16 above the block 13 are provided to adjust levelness. Suction cup 2B holds the frame 1 in position on the roof of the vehicle 17. Also connected to the frame 1 is the guide bar 3B to which is connected the shim 4B. Connected to the shim 4B is pneumatic cylinder 14 which moves the shim 4B up and down. When the cylinder 14 is extended the shim 4B moves into space 11 between and the gasket 12 and the edge of the vechicle surrounding the sunroof opening 10. As a result of the shim 4B being extended into the space 11, the sunroof 18 is shifted forward by the thickness of the shim, e.g. 3.2 mm in the above noted example.

Figure 3:
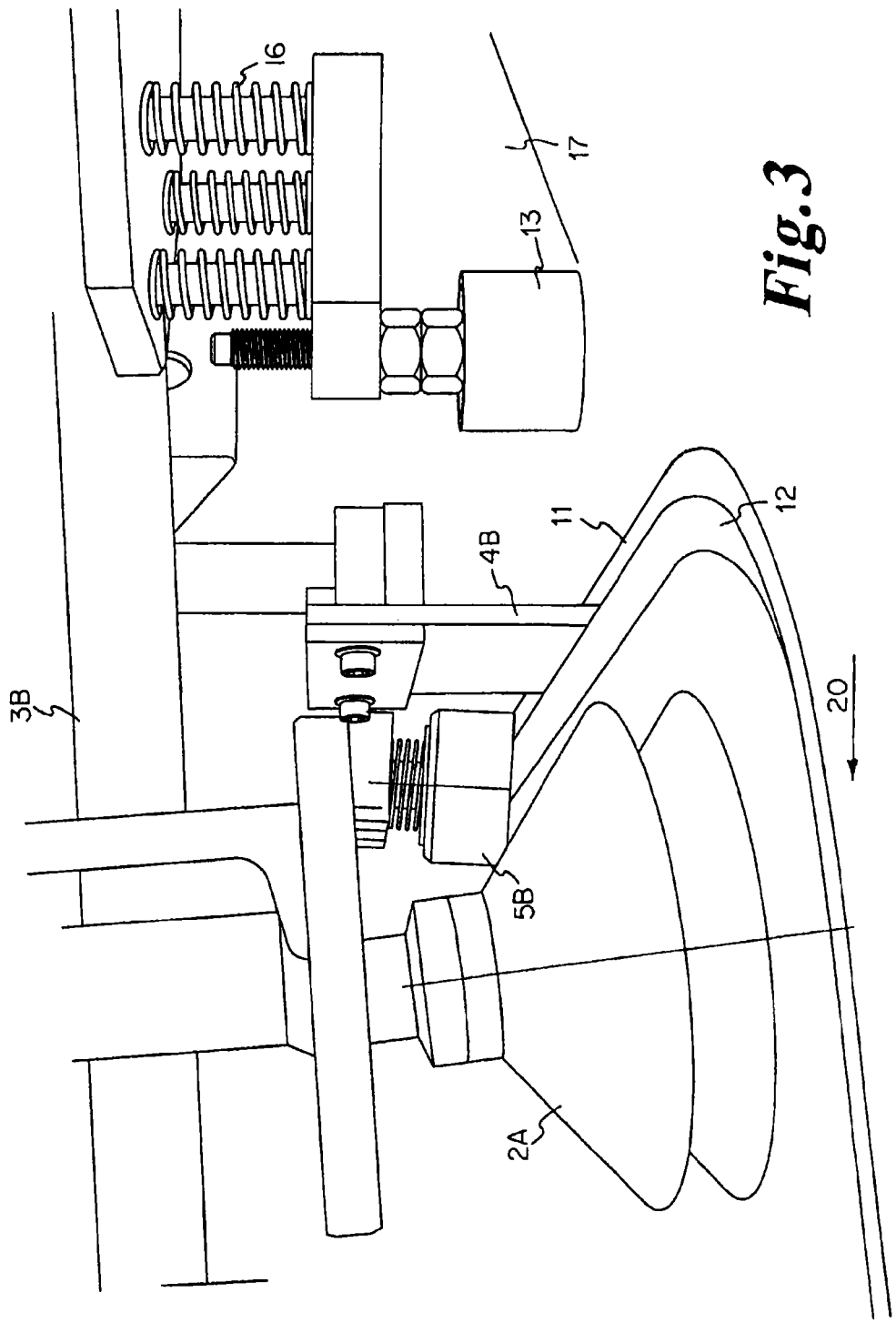
FIG. 3 illustrates a closer view of the shim inserted into a space between a body opening of a vehicle and a gasket on a sunroof.

FIG. 3 illustrates the position of the shim 4B after the shim 4B has extended into the space 11. As a result of the insertion of shim 4B into the space 11, the sunroof 18 moves in the direction of arrow 20. Block 13 maintains its position on the roof of the vehicle 17.

Figure 4A:
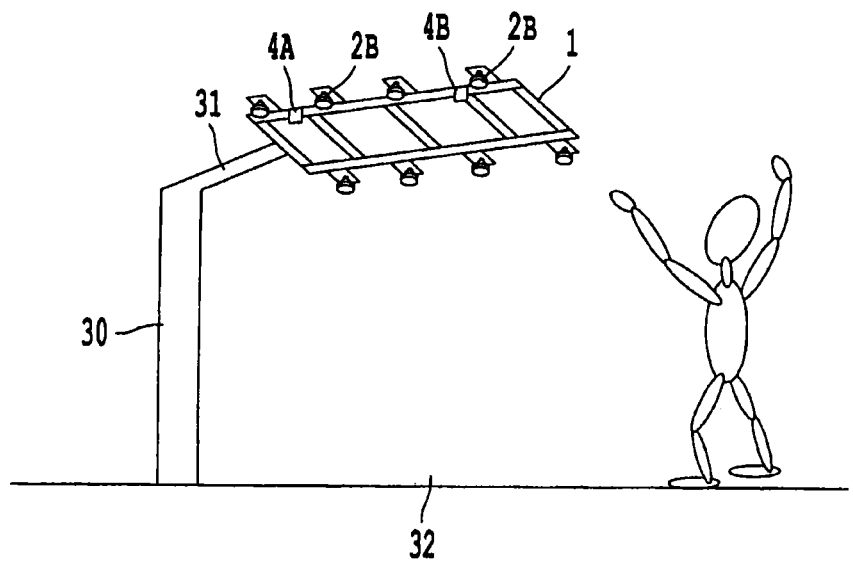
FIGS. 4A and 4B illustrate a wide view showing the process whereby the frame is moved onto the vehicle.
Figure 4B:
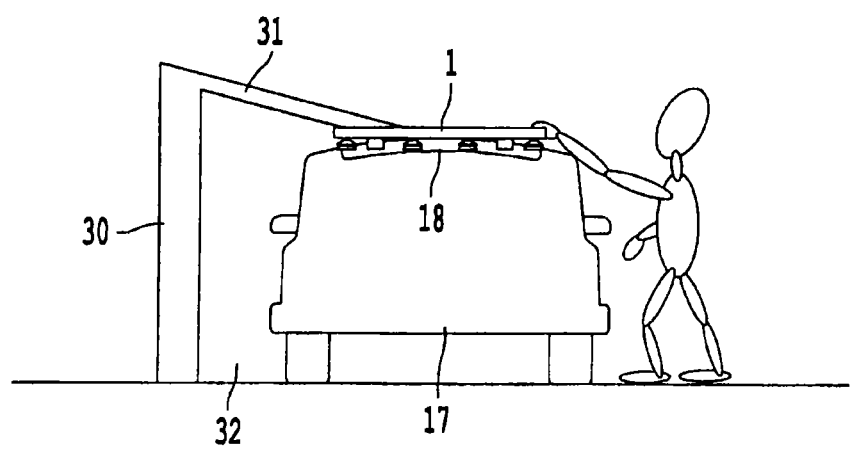

FIGS. 4A-B illustrate a wide view showing the process whereby the frame 1 is moved onto the vehicle 17. As is illustrated in FIG. 4A, the frame 1 is connected to a retractable arm 31 which connected to a base 30. Once the vehicle 17 is moved into an area 32, the frame 1 is positioned onto the vehicle 17 such that the suction cups 2B of the frame 1 are in contact with the sunroof 18. In addition, the frame 1 is positioned such that datuming blocks 5A and 5B are at an edge of the of the vehicle 17 surrounding the sunroof opening 10 in which the sunroof 18 is placed.

Figure 5:
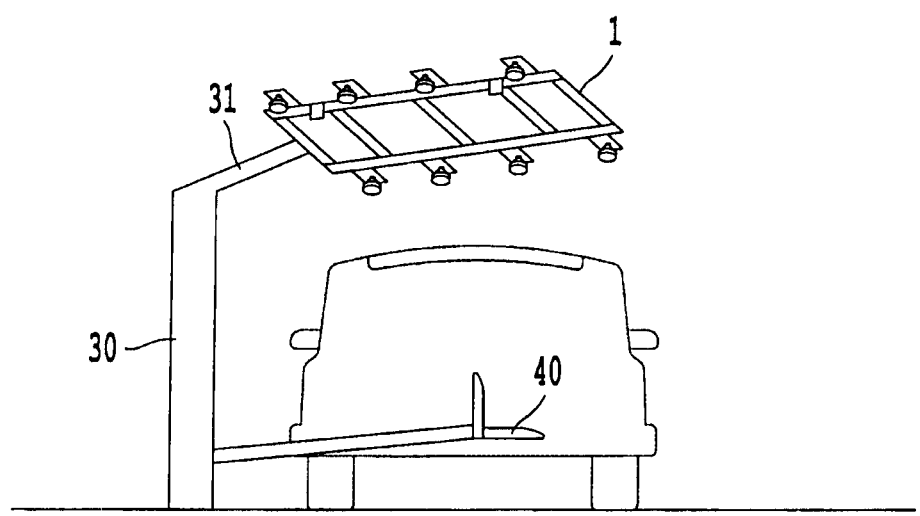
FIG. 5 illustrates a raku seat which moves into the inside of the vehicle and supports an installer during the sunroof leveling and shim insertion operation.

FIG. 5 illustrates a raku seat 40 which moves into the inside of the vehicle 17 and supports an installer during sunroof leveling and shim insertion operations. The raku seat 40 is a sliding seat—a means of easy and quick access to sections of vehicle which otherwise would be difficult to approach ergonomically.

Figure 6B:
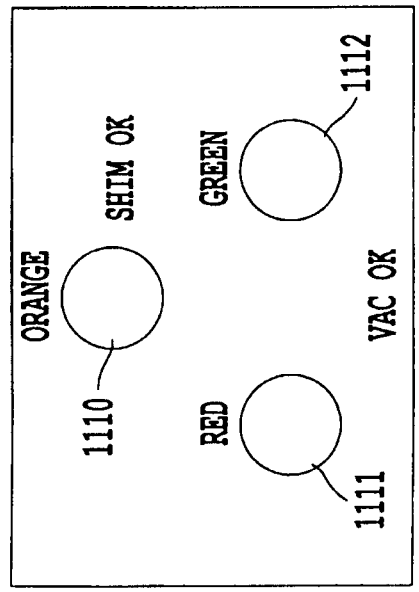
FIGS. 6A and 6B illustrate an example of a control and information panels.
Figure 6A:
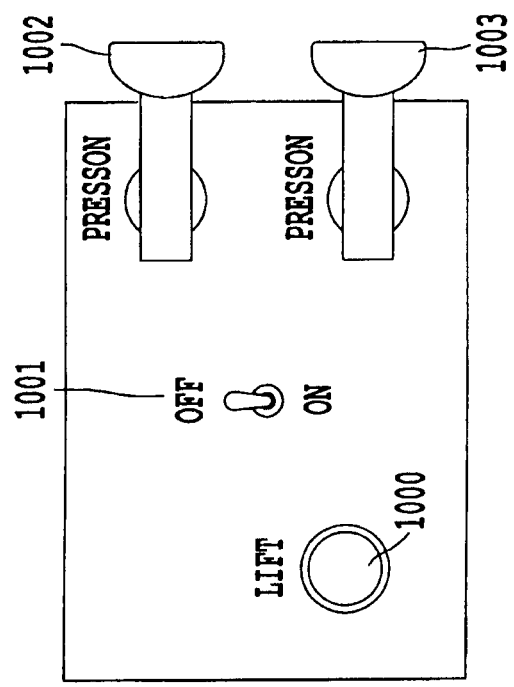

FIG. 6A illustrates an example of the control panel for the present system. Item 1000 is a lift up and down button which moves the frame away and towards the body of the vehicle 17. 1001 is an ON and OFF switch which turns ON and OFF the system. 1002 turns on the vacuum for leveling method procedure switch 1003 activates the shim 4A/B insertion. This control can also be done via computer or display or touch screen display which includes inputs to lift up and down the device, turn ON and OFF the device or switch the vacuum or activate the shim 4A/B insertion. FIG. 6B illustrates the example of light indicators which provide indications of the readiness states of the device. Element 1110 indicates shim insertion OK condition. Green light 1112 indicates vacuum OK condition and red light 1111 indicates no vacuum condition.

Figure 7:
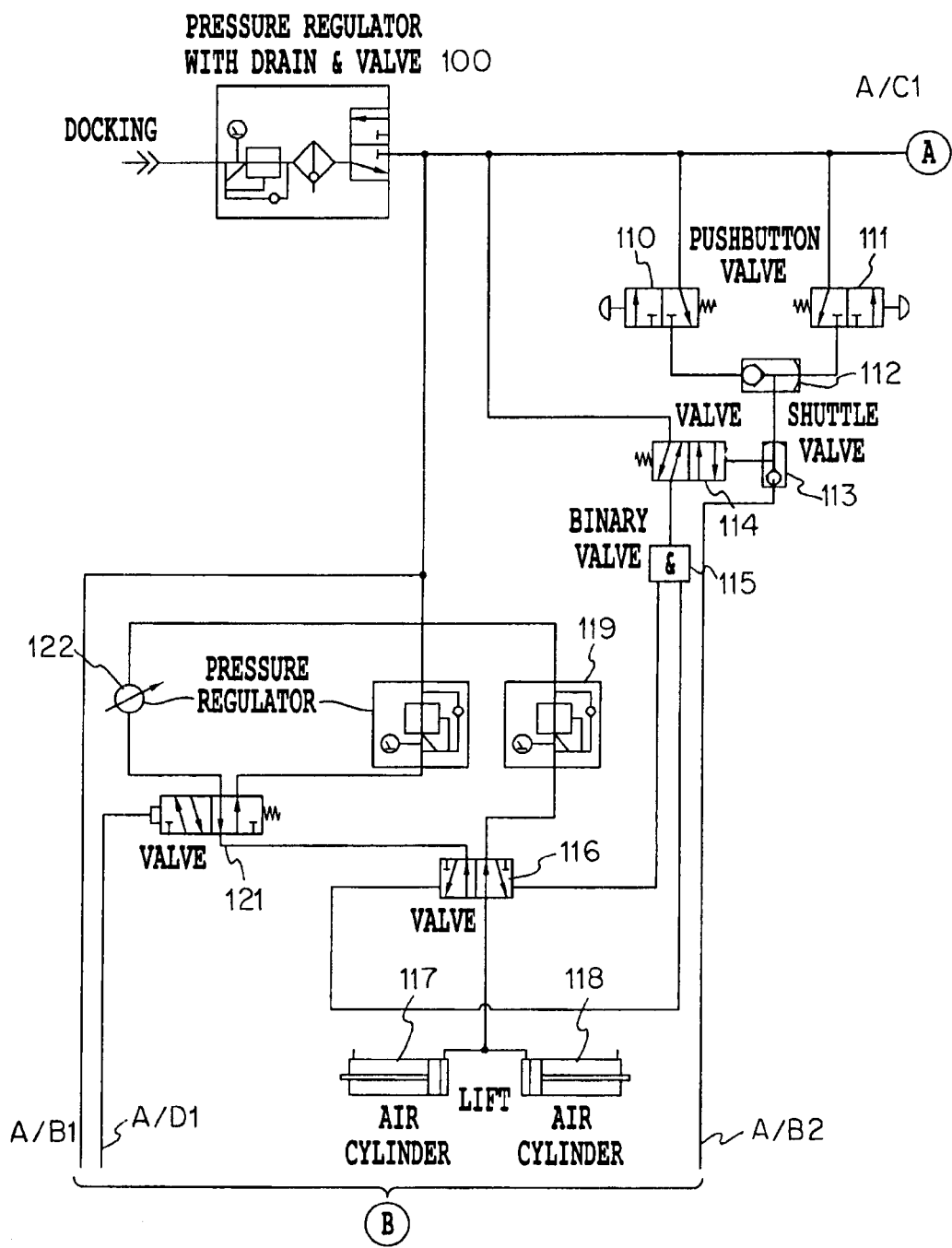
FIG. 7 illustrates a portion of a pneumatic diagram corresponding to an embodiment of the disclosure.

FIG. 7 illustrates a portions of a pneumatic system including a pressure regulator with a drain and a three-port two-way valve 100 fluidly connected to two-way three-port push button spring return values 110 and 111. Pressure regulator 100 is also fluidly connected to a portion of the pneumatic system illustrated in FIG. 11 via connection point A/C1, to a portion of the pneumatic system illustrated in FIG. 10 via connection point A/B1, two-way three port solenoid with spring return valve 114, and pressure regulators 119, 120 and 122. Push button soring return valves 110 and 111 are connected to shuttle valve 112. Shuttle valve 112 is connected to shuttle valve 113. Shuttle valve 113 is connected to an air operation port of spring return valve 114 and The portion of the pneumatic system illustrated in FIG. 10 via connection point A/B2. Spring return Valve 114 is also connected to the binary valve 115. Binary valve 115 is connected to an air operated four-way five-port valve 116, which is connected to air cylinders 117 and 118, pressure regulator 119, and five port four-way air piloted spring return valve 121. An operation of the air cylinders 117 and 118 corresponds to an UP/DOWN movement of the frame 1 (end effector). Valve 121 is connected to pressure regulators 120, 122 and a portion of the pneumatic system illustrated FIG. 12 via connection point A/D1.

Figure 8:
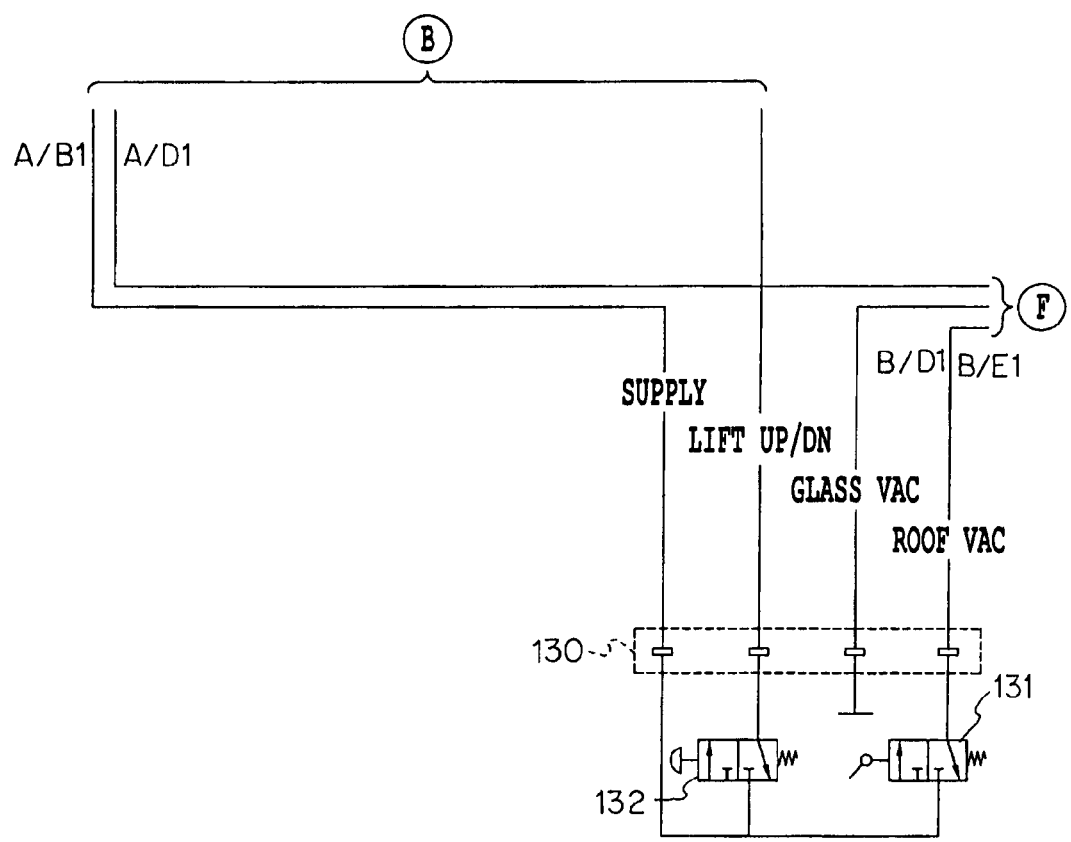
FIG. 8 illustrates a portion of the pneumatic diagram corresponding to an embodiment of the disclosure.

FIG. 8 incldes four connection points, A/B1, A/D1, B/D1 and B/E1. Each of the four connection points is connected to the connector tubes 130. The line "supply"corresponds to the main air supply, the line"lift UP/DN" corresponds to the end effector up/down, the line "glass vac" corresponds to the glass vacuum, and the "roof vac" line corresponds to the roof vacuum. By way of the connector tubes 130, connection point A/B1 is connected to valve 131 and valve 132. Valve 132 is a two position three-way normally open push press operated with spring return valve and valve 131 is a lever operated normally open two-position three-way valve. Valve 132 is also connected to connection point A/B2 via connector tubes 130 and Valve 131 is also connected to connection point B/D2 via connector tubes 130. When the lever of valve 131 is closed, valve 131 is also connected to connection point B/D1 via connector tubes 130.

Figure 9:
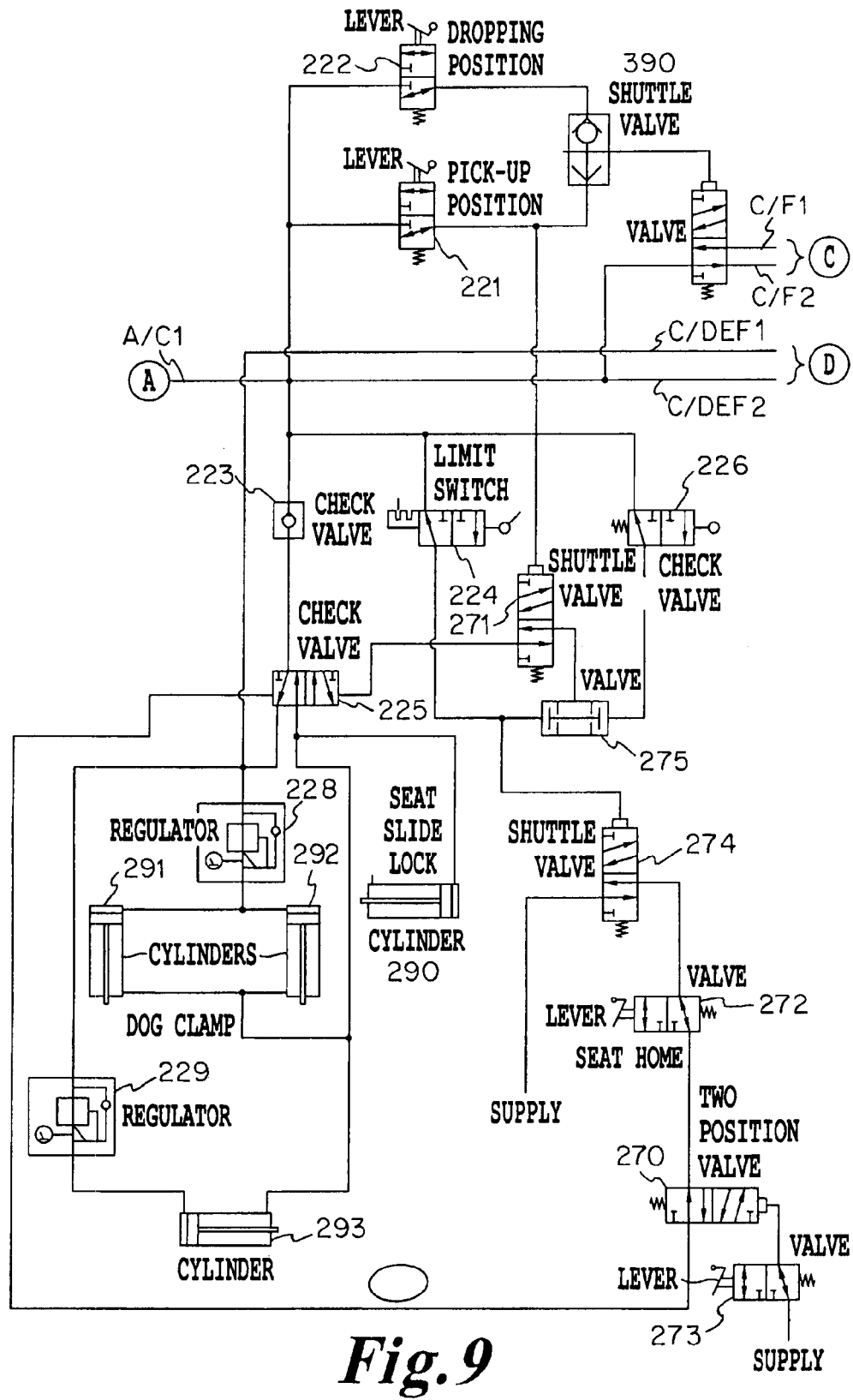
FIG. 9 illustrates a portion of the pneumatic diagram corresponding to an embodiment of the disclosure.

FIG. 9 includes five connection points, A/C1, C/F1, C/F2, C/DEF1, and C/DEF2. Connection point A/C1 is connected to check valve 223, limit switch 224, check valve 226, as well as lever valves 221 and 222 (normally closed). Lever valve 222 is connected to shuttle valve 390. Lever valve 221 is connected to shuttle valve 390 and shuttle valve/OR valve 271. Check valve 223 is connected to check valve 225. Valve 225 is connected to two position valve 270, valve 271, seat slide lock cylinder 290, cylinder 293, regulator 228, regulator 229 and cylinders 291 and 292. Cylinder 291 engages (syncs) sunroof leveling equipment to the vehicle carrier. Cylinders 292 and 293 provide clamps to facilitate the sync to the vehicle carrier. Detent valve 224 is connected to "and" gate shuttle valve 275 and shuttle valve 274. Valve 274 is connected to lever valve 272 and to air supply. The term "seat home" shown in FIG. 9 indicates that the Raku seat has to be in a home position before equipment can sync with vehicle. Lever valve 272 is connected to valve 270 which is connected to valve 225 and lever valve 273 connected to the air supply.

Figure 10:
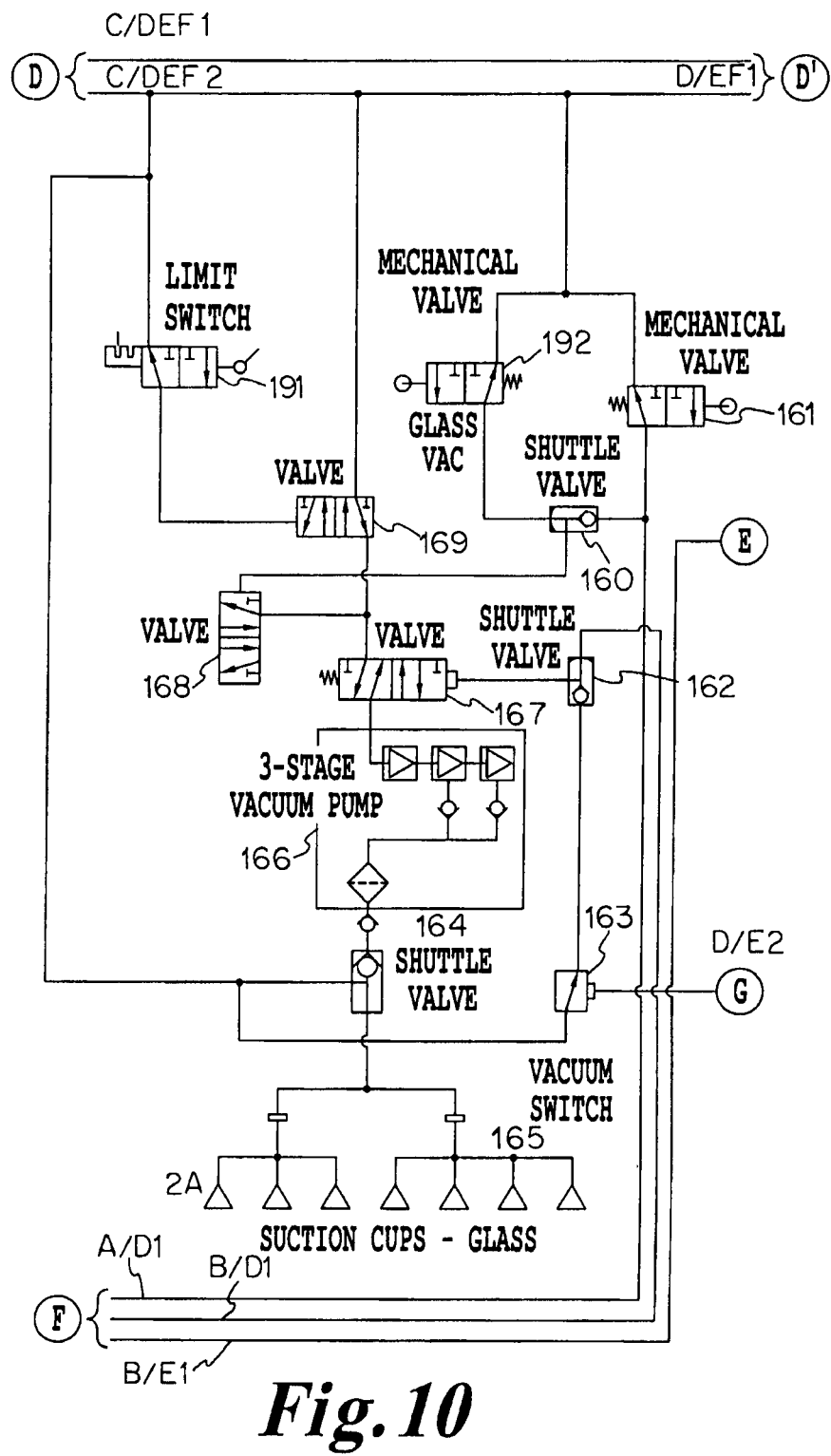
FIG. 10 illustrates a portion of the pneumatic diagram corresponding to an embodiment of the disclosure.

FIG. 10 includes four connection points, C/DEF2, D/EF1, A/D1 and B/D1. C/DEF2 is connected to limit switch 191, two position spring return valve 169, mechanical valves (limit switch) 192 and 161, shuttle valve 164 and vacuum switch 163. Valves 192 and 161 are included because the system can operate with cars of different heights (e.g. Corolla™ and Matrix™ which are built on the same assembly line but have different roof heights). Valve 169 is connected to valve 168 and valve 167. Valves 168 and 167 are two position valves to control air flow for the care of different heights. Valve 168 is also connected to shuttle valve 160. Shuttle valve 160 is connected to valves 192 and 161 and connection point A/D1. Valve 167 is connected to shuttle valve 162 and 3-stage vacuum pump 166. The 3-stage vacuum pump 166 is connected to shuttle valve 164 which is connected to suction cups 165 corresponding to glass suction cups 2A. Shuttle valve 164 is also connected to vacuum switch 163 which is connected to shuttle valve 162 and connection point D/E2. Shuttle valve 162 is connected to valve 167 and connection point B/D1.

Figure 11:
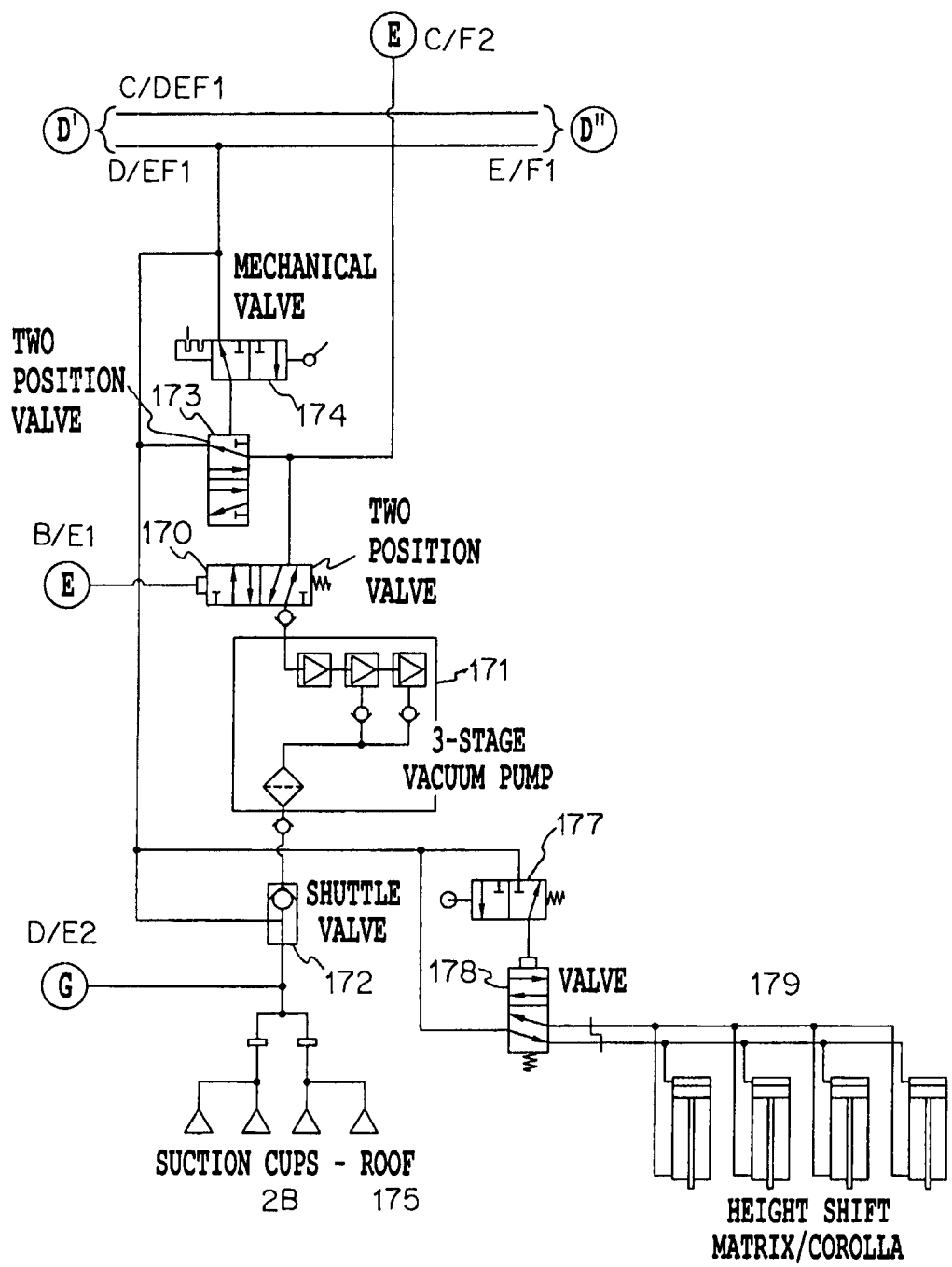
FIG. 11 illustrates a portion of the pneumatic diagram corresponding to an embodiment of the disclosure.

FIG. 11 includes four connection points, D/EF1, E/F1, B/E1 and D/E2. Connection points D/EF1 and E/F1 are connected to mechanical spring loaded valve 174 controlling air flow to the roof suction cups, two position valve 173, valve 177, and shuttle valve 172. Valve 173 is connected to connection point E/F2 and two position valve 170. Valve 170 is connected to connection point B/E1 and three-stage vacuum pump 171. Three-stage vacuum pump 171 is connected to shuttle valve 172 which is connected to connection point D/E2 and suction cups 175 which correspond to roof suction cups 2B. Valve 178 is connected to valve 177 and height shift cylinders 179. Upon sensing the vehicle model (e.g. Corolla™ or Matrix™ based on roof height, these cylinders 179 actuate to perform levelness function.

Figure 12:
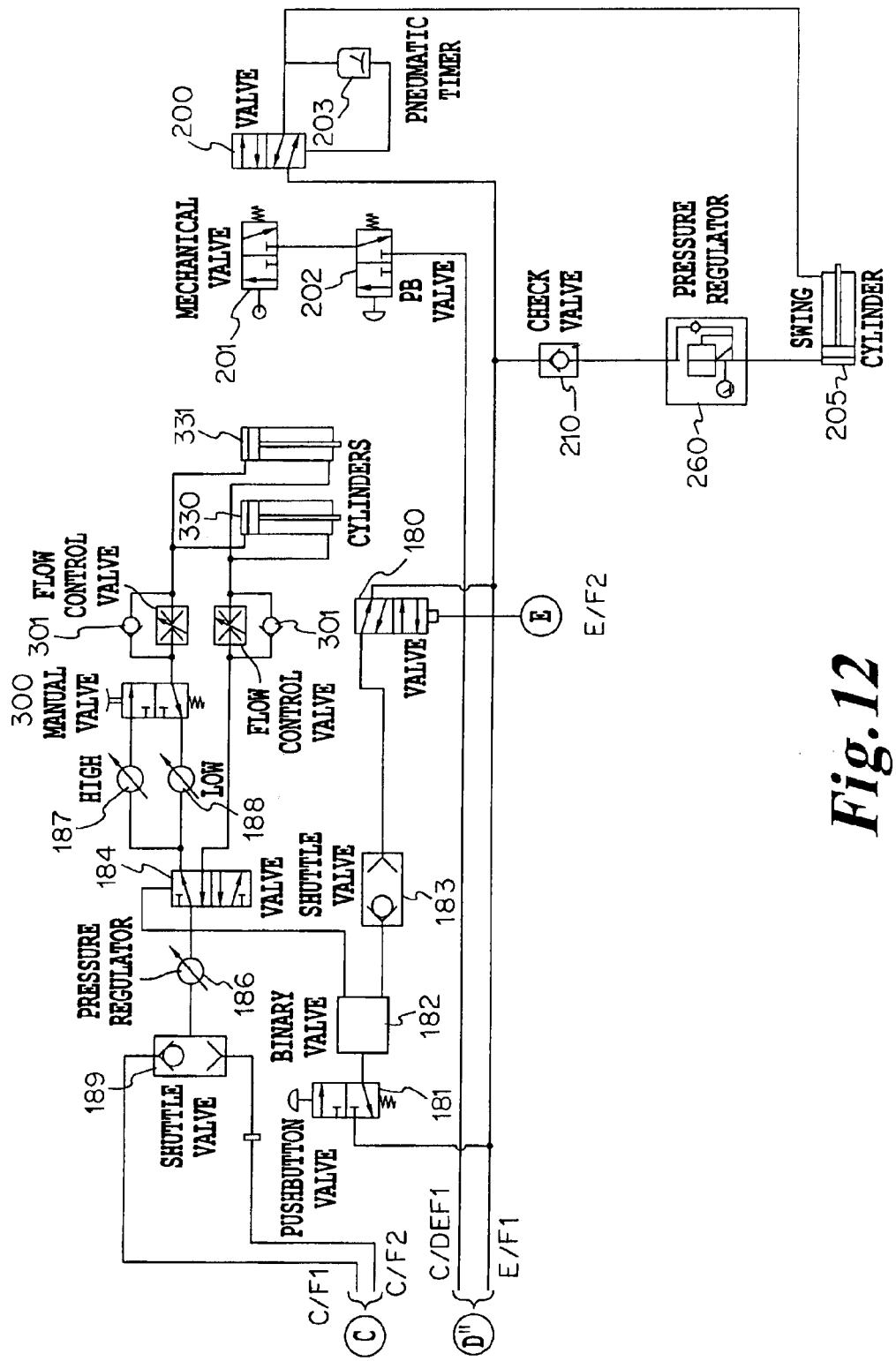
FIG. 12 illustrates a portion of the pneumatic diagram corresponding to an embodiment of the disclosure.

FIG. 12 includes five connection points, C/F1, C/F2, C/DEF1, E/F1 and E/F2. Connection points C/F1 and C/F2 are connected to shuttle valve 189. Shuttle valve 189 is connected to pressure regulator 186 which is connected to two position double pilot valve 184 for two stage shimming. Valve 184 is connected to binary valve 182, high pressure regulator 187 and low pressure regulator 188. Manual valve 300 is connected to both the high and low pressure regulators 187 and 188 and flow control valve 301. Flow control valve 301 is connected to cylinders 330 and 331. Cylinders 330 and 331 are used for shim insertion. Cylinders 330 and 331 are also connected to flow control valve 302 which is connected back to valve 184. Binary valve 182 is connected to pushbutton valve 181 and shuttle valve 183. Shuttle valve 183 is also connected to two position spring loaded pilot valve 180. Valve 180 is connected to connection points, E/F2 and E/F1 as well as push button valve 181, check valve 210 and two position double pilot valve 200. Connection point C/DEF1 is connected to push button valve 202 which is connected to spring loaded mechanical valve 201. Valve 200 is connected to pneumatic timer 203 and swing cylinder 205 which is connected to pressure regulator 260 which is connected to check valve 210. Swing cylinder 205 controls end effector swing movement.

Figure 13:
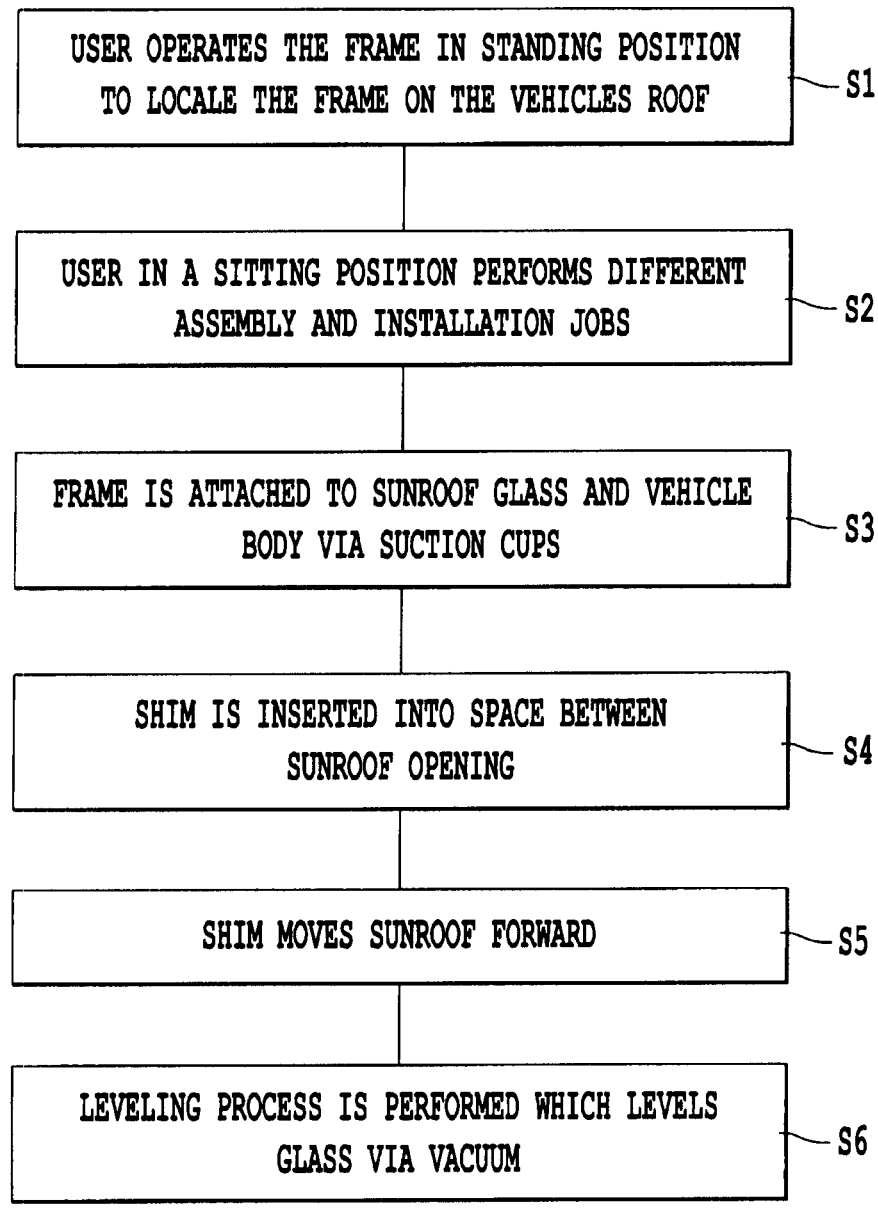
FIG. 13 illustrates a flow diagram corresponding to a method of an embodiment of the disclosure.

FIG. 13 describes an embodiment of the disclosure in which a method of using the disclosure is shown. In FIG. 15 step S1 illustrates the first step of an installer operating the frame 1 to position the frame 1 on the vehicle roof 17. Datuming blocks 5A&B enable the installer to position side A of the frame correctly with respect to the body opening 10 in the vehicle roof. In addition, blocks 6A and 6B facilitate the positioning of the frame 1 in the body opening 10 of the sunroof in the vehicle 17.

The installer then, in step S2 and in a sitting position, for example, on the raku seat 40, performs different assembly and installation jobs inside the vehicle 17. For example, tightening the screws which hold the sunroof assembly 18 in the vehicle 18 or aligning the sunroof 18.

In step S3, the frame 1 is then attached to the sunroof glass 18. Once the frame 1 is attached to the sunroof glass, in step S4, a shim 4A/B is inserted into the space 11 between the gasket 12 and the edge of the body opening 10. The insertion of the shim 4A/B in step S4 is a dual stage shim insertion. First, low pressure cylinders (330 & 331) extend shims just above the roof surface and the installer aligns the frame 1 with the body opening 10. The shims 4A/B are then fully extended in-between the body opening 10 and the sunroof gasket 12 to be in a position to shift the glass forward.

In step S5, the frame 1 and the shim 4A/B moves/shifts the sunroof glass 18 forward.

Once the step of moving the sunroof glass 18 forward has completed, in step S6, a leveling process is performed which levels the glass being held by the vacuum powered suction cups. By shifting the glass forward before the levelness procedure, issues related to pinching of the sunroof gasket 12 getting caught in the body opening are avoided.

In the leveling process the suction cups 2A hold the glass 18 by vacuum. The sunroof leveling process entails pulling sunroof glass up using vacuum powered suction cups and pneumatic cylinders so as to achieve glass positioning as per vehicle specifications e.g., 0.5+/−1 mm in reference to vehicle roof surface.

In the embodiment in which suction cups 22 are also attached to the sunroof glass 18, a pressure switch senses vacuum and actuates cylinders and the cylinders (330 & 331) thus create forward shift.

The shim insertion leveling system can include a control module or display module which indicates the level of readiness of the device as well as enables the user to utilize the device.

The shim insertion level system of the present disclosure is not limited to shifting a sun-roof in a car. The disclosure can be applied to other applications such as shifting body panels of a car, shifting a windshield, or shifting a window in a manufactured home, for example. Any implementation in which a body has an opening and in which a glass plane (e.g. glass plate) is installed and shifted could be benefited by the features of the present disclosure.

Modifications to embodiments of the disclosure described in the foregoing are susceptible to being implemented without departing from the scope of the disclosure as defined by the appended claims.

As should be apparent, the disclosure can provide a number of advantageous features and benefits. It is to be understood that, in practicing the disclosure, an embodiment can be constructed to include one or more features or benefits of embodiments disclosed herein, but not others. Accordingly, it is to be understood that the preferred embodiments discussed herein are provided as examples and are not to be construed as limiting, particularly since embodiments can be formed to practice the disclosure that do not include each of the features of the disclosed examples.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A frame device that can be attached to a glass plane and positioned relative to an opening of a body with the glass plane attached to the frame device, the frame device comprising:
   a frame including a first part and a second part;
   a plurality of first suction devices connected to the first part of the frame, the first suction devices positioned so as to contact the glass plane;
   a plurality of second suction devices connected to the second part of the frame, the second suction devices positioned so as to contact the body having the opening;
   a plurality of positioning components that position the frame with respect to the opening in the body, the positioning components connected to the first part of the frame; and
   a plurality of shimming elements that move between the glass plane and the opening and shift the glass plane forward, the shimming elements connected to the first part of the frame,
   wherein the frame device moves the glass plane into the opening and the plurality of shimming elements move between the glass plane and the opening and shift the glass plane forward.

2. The frame device according to claim 1, wherein the second part of the frame includes additional positioning components.

3. The frame device according to claim 1, wherein the shimming elements are each connected to a pneumatic cylinder which facilitates movement down between the glass plane and the opening.

4. The frame device according to claim 1, wherein the frame further includes a lighting element connected to the frame.

5. The frame device according to claim 1, wherein the first and second suction devices are each vacuum operated.

6. The frame device according to claim 5, further comprising:
   a control device that enables input and that controls movement of the shimming elements and a vacuum operation of the first and second suction devices.

7. The frame device according to claim 1, further comprising a base,
   wherein the frame is attached to the base which swivels the frame between two distinct positions.

8. The frame device according to claim 7, further comprising a raku seat,
   wherein the raku seat is connected to the base and swivels under the frame independently of the frame.

9. The frame device according to claim 7, wherein the base is connected to the frame by way of an extendable arm.

10. The frame device according to claim 1, wherein a spring is disposed between the positioning components and the first part of the frame.

11. The frame device according to claim 1, further comprising:
    a control device that enables input and that controls movement of the shimming elements.

12. The frame device according to claim 1, wherein the glass plane is an automobile sun-roof.

13. The frame device according to claim 1, wherein the body, having the opening to receive the glass plane, is an automobile.

14. The frame device according to claim 1, wherein the positioning components are datuming blocks.

15. The frame device according to claim 1, wherein each of the plurality of shimming elements has a same thickness,
    wherein at least one of the plurality of shimming elements is a panel, and
    wherein the glass plane moves forward in the opening a distance equal to the same thickness.

16. The frame device according to claim 15, wherein respective lengths of the plurality of shimming elements are not the same.

17. A frame device that can be attached to a glass plane and positioned relative to an opening of a body with the glass plane attached to the frame device, the frame device comprising:
    supporting means including a first part and a second part;
    first suction means, connected to the first part of the supporting means, for contacting the glass plane;
    second suction means, connected to the second part of the supporting means, for contacting the body having the opening to receive the glass plane;
    positioning means for positioning the supporting means with respect to the opening in the body, the positioning means connected to the first part of the supporting means; and
    shimming means for moving down between the glass plane and the opening and for shifting the glass plane forward, the shimming means connected to the first part of the supporting means,
    wherein the frame device moves the glass plane into the opening and the shimming mean moves between the glass and the opening and shift the glass plane forward.

* * * * *